(12) United States Patent
Morikawa et al.

(10) Patent No.: US 10,383,341 B2
(45) Date of Patent: Aug. 20, 2019

(54) FOOD DOUGH SPREADING DEVICE AND FOOD DOUGH SPREADING METHOD

(71) Applicant: RHEON AUTOMATIC MACHINERY CO., LTD., Tochigi (JP)

(72) Inventors: Michio Morikawa, Tochigi (JP); Koichi Hirabayashi, Tochigi (JP); Susumu Kominato, Tochigi (JP); Masashi Fukuda, Tochigi (JP)

(73) Assignee: RHEON AUTOMATIC MACHINERY CO., LTD., Tochigi (JP)

( * ) Notice: Subject to any disclaimer, the term of this patent is extended or adjusted under 35 U.S.C. 154(b) by 0 days.

(21) Appl. No.: 14/398,015

(22) PCT Filed: May 28, 2013

(86) PCT No.: PCT/JP2013/064746
§ 371 (c)(1),
(2) Date: Oct. 30, 2014

(87) PCT Pub. No.: WO2013/180115
PCT Pub. Date: Dec. 5, 2013

(65) Prior Publication Data
US 2015/0110930 A1    Apr. 23, 2015

(30) Foreign Application Priority Data

Jun. 1, 2012 (JP) ................................. 2012-125858

(51) Int. Cl.
*A21C 9/08* (2006.01)
*A21C 11/10* (2006.01)
(Continued)

(52) U.S. Cl.
CPC ................ *A21C 11/10* (2013.01); *A21C 3/02* (2013.01); *A21C 3/04* (2013.01); *A21C 9/085* (2013.01)

(58) Field of Classification Search
CPC .. A21C 3/02; A21C 3/04; A21C 9/085; A21C 1/10
(Continued)

(56) References Cited

U.S. PATENT DOCUMENTS 4,692,107 A    9/1987  Morikawa et al.
4,904,491 A    2/1990  Morikawa et al.
(Continued)

FOREIGN PATENT DOCUMENTS

CA    2051828    8/1995
CA    2488742    8/2007
(Continued)

OTHER PUBLICATIONS

Office Action issued in European Patent Office (EPO) Counterpart Patent Appl. No. 13797581.9, dated Jul. 5, 2017.
(Continued)

*Primary Examiner* — Seyed Masoud Malekzadeh
(74) *Attorney, Agent, or Firm* — Greenblum & Bernstein, P.L.C.

(57) ABSTRACT

To provide a food dough spreading method for gradually spreading food dough to make it thinner by supplying the food dough between a plurality of spreading rollers in a spreading unit in which the spreading rollers are arranged in a V-shape. By adjusting a distance between a pair of vibration applying members provided between the spreading rollers arranged in a V-shape, a width dimension of the food dough flowing out from the spreading unit (25) is adjusted, and the vibration applying members are reciprocatively vibrated in a longitudinal direction of the spreading rollers (Continued)

at a position where the width dimension is adjusted. The reciprocative vibration of the pair of vibration applying members is vibration in a direction of approaching and separating from each other.

9 Claims, 13 Drawing Sheets

(51) Int. Cl.
*A21C 3/04* (2006.01)
*A21C 3/02* (2006.01)

(58) Field of Classification Search
USPC .................................................. 425/140, 365
See application file for complete search history.

(56) References Cited

U.S. PATENT DOCUMENTS

| | | | | |
|---|---|---|---|---|
| 4,957,426 | A * | 9/1990 | Hayashi | A21C 3/027 425/367 |
| 5,091,202 | A | 2/1992 | Hayashi | |
| 5,804,225 | A * | 9/1998 | Hayashi | A21C 3/027 425/363 |
| 5,871,796 | A * | 2/1999 | Morikawa | A21C 3/02 425/145 |
| 5,888,573 | A | 3/1999 | Hayashi | |
| 6,159,518 | A * | 12/2000 | Wilson | A21C 3/02 264/169 |
| 6,171,629 | B1 | 1/2001 | Morikawa | |
| 6,257,861 | B1 * | 7/2001 | Morikawa | A21C 3/027 425/363 |
| 6,268,004 | B1 * | 7/2001 | Hayashi | A21C 3/02 426/496 |

FOREIGN PATENT DOCUMENTS

| | | |
|---|---|---|
| CN | 1052988 | 7/1991 |
| CN | 1053992 | 8/1991 |
| CN | 1161145 | 10/1997 |
| CN | 2822224 | 10/2006 |
| EP | 0197671 | 10/1986 |
| EP | 0415714 | 3/1991 |
| EP | 0545725 | 6/1993 |
| EP | 1174032 | 1/2002 |
| JP | 36-18083 | 10/1961 |
| JP | 63-54334 | 10/1988 |
| JP | 01-191635 | 8/1989 |
| JP | 3-297342 | 12/1991 |
| JP | 9-172938 | 7/1997 |
| JP | 3056697 | 6/2000 |
| JP | 2001-321061 | 11/2001 |
| JP | 2006-055120 | 3/2006 |
| JP | 2006-314266 | 11/2006 |
| JP | 2009-278934 | 12/2009 |

OTHER PUBLICATIONS

EPO Search Report EPO Patent Application No. 13797581.9, dated Mar. 30, 2016.
Official Action issued in counterpart EP Appl. No. 13797581.9 dated Sep. 5, 2018.
Office Action issued in China Counterpart Patent Appl. No. 201380027557.8, dated Oct. 21, 2015.
Search report from International Patent Appl. No. PCT/JP2013/064746, dated Aug. 27, 2013.
Office Action issued in India Counterpart Patent Appl. No. 10976/DELNP/2014, dated Jan. 18, 2019 with English language translation.

* cited by examiner

FIG. 8(A)  FIG. 8(B)  FIG. 8(C)
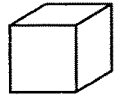
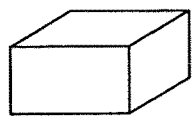
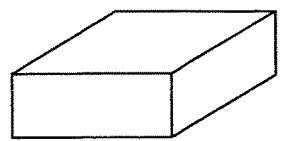
FIG. 9(A)
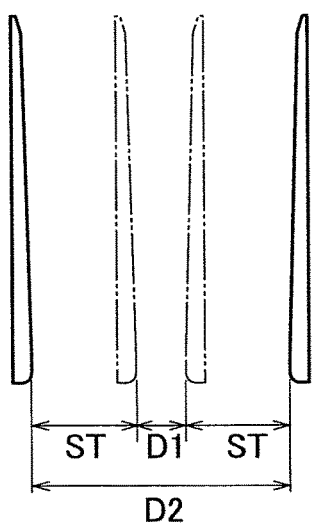
FIG. 9(B)
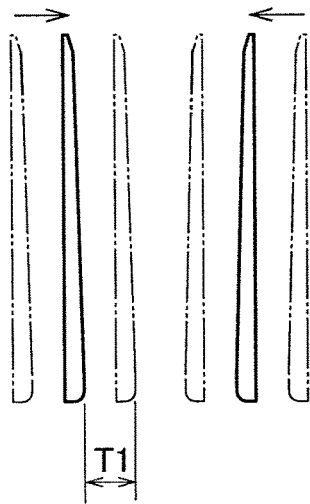
FIG. 9(C)
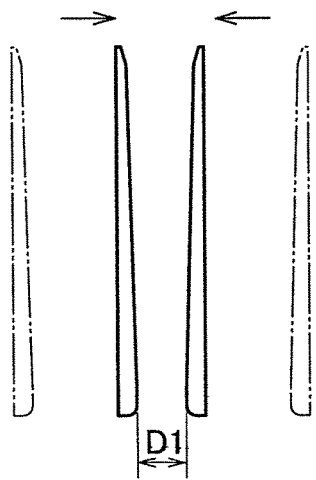
FIG. 9(D)
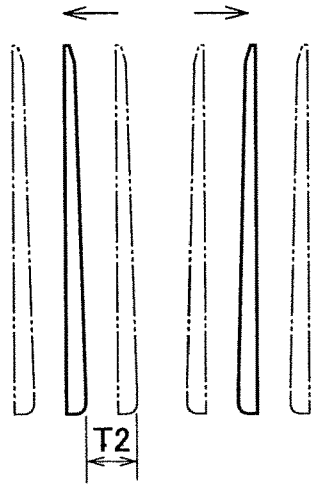

FOOD DOUGH SPREADING DEVICE AND FOOD DOUGH SPREADING METHOD

TECHNICAL FIELD

The present invention relates to a method and a device for spreading arbitrary food dough, for example, bread dough, and more particularly relates to a food dough spreading device and a food dough spreading method that can adjust a width dimension of spread food dough to a desired dimension, and can suppress internal stress at both side edges in a width direction.

BACKGROUND ART

For example, when arbitrary food dough such as bread dough is spread, a spreading unit having a plurality of spreading rollers arranged in a V-shape is provided below a hopper that stores therein the food dough, and the food dough is supplied from the hopper to between the spreading rollers so that the food dough is gradually spread to be made thinner. It has been proposed to adjust a pair of width regulating members arranged between the spreading rollers in a direction approaching and separating from each other, in order to adjust the width dimension of the food dough to be spread by the spreading rollers (see, for example, Patent Literature 1).

PRIOR ART DOCUMENTS

Patent Literature

Patent Literature 1: Japanese Patent Application, Publication No. Sho-36-18083

DISCLOSURE OF INVENTION

Technical Problem

According to the configuration described in Patent Literature 1 mentioned above, both sides in a width direction of food dough to be spread gradually by a plurality of spreading rollers are regulated by a pair of width regulating members. Because the width regulating members are position-adjustable, the width dimension of the food dough to be spread can be adjusted. However, in the above configuration, the width regulating member can be only position-adjustable, and thus the both side edges in the width direction of food dough to be gradually spread to be made thinner by the spreading rollers tend to be pressed against the width regulating member and to adhere thereto. Therefore, there is a problem that the internal stress tends to be applied to the both side edges of the food dough to be spread.

Accordingly, an object of the present invention is to provide a food dough spreading device and a food dough spreading method that can avoid internal stress remaining in food dough by repeating compression and release of the food dough and repeating application and release of the internal stress.

Technical Solution

To achieve the above object, a first aspect of the present invention is to provide a food dough spreading device for gradually spreading food dough to make it thinner, the device comprising: at least two opposite spreading rollers; and a pair of vibration applying members provided between the at least two opposite spreading rollers, which can freely regulate a width dimension of the food dough to be spread by the spreading rollers and is position-adjustable in a longitudinal direction of the spreading rollers, wherein the vibration applying members are reciprocatively vibrated in a direction approaching and separating from each other in the longitudinal direction of the spreading rollers at a position where the width dimension of the food dough is adjusted, thereby applying vibration to the food dough.

A second aspect of the present invention is to provide the food dough spreading device according to the first aspect, wherein the spreading rollers are arranged so that at least three spreading rollers are opposite to each other and a distance between the spreading rollers positioned downside is smaller than a distance between the spreading rollers positioned upside.

A third aspect of the present invention is to provide the food dough spreading device according to the first aspect, wherein when the pair of vibration applying members are operated to approach each other, a feed rate of the food dough by the spreading rollers is reduced to zero or to a low speed, and when the pair of vibration applying members are operated to be separated from each other, the feed rate of the food dough by the spreading rollers is increased than the feed rate of the food dough when the vibration applying members are operated to approach each other.

A fourth aspect of the present invention is to provide the food dough spreading device according to the first aspect, wherein reciprocative vibration of the pair of vibration applying members is set so that a separating operation speed is faster than an approaching operation speed.

A fifth aspect of the present invention is to provide the food dough spreading device according to the third aspect, wherein a deceleration region is provided in a rotation speed of the spreading rollers.

A sixth aspect of the present invention is to provide the food dough spreading device according to the first aspect, wherein the vibration applying members are provided so as to stop temporarily at an open position where the vibration applying members are separated farthest from each other.

A seventh aspect of the present invention is to provide the food dough spreading device according to the first aspect, wherein a transfer unit that transfers the food dough and a measuring and cutting device are provided below the spreading rollers.

An eighth aspect of the present invention is to provide the food dough spreading device according to the seventh aspect, wherein the measuring and cutting device is provided between the transfer unit and a measuring conveyor provided on a downstream side thereof, and when the food dough has been measured to a measurement value corresponding to a desired weight set beforehand, the food dough is cut by a cutter device arranged between the transfer unit and the measuring conveyor.

A ninth aspect of the present invention is to provide the food dough spreading device according to the seventh aspect, wherein the measuring and cutting device is provided between the transfer unit and the measuring conveyor provided on the downstream side thereof; a second measuring conveyor is provided on a further downstream side of the measuring conveyor; and a cut piece after being cut by the measuring and cutting device is measured again by the second measuring conveyor, and is transferred to a next step.

A tenth aspect of the present invention is to provide a food dough spreading method for gradually spreading food dough to make it thinner, the method comprising: spreading the food dough by at least two opposite spreading rollers; and applying vibration to the food dough by reciprocatively vibrating a pair of vibration applying members that is provided between the at least two opposite spreading rollers and can freely regulate a width dimension of the food dough to be spread by the spreading rollers in a direction approaching and separating from each other in a longitudinal direction of the spreading rollers.

An eleventh aspect of the present invention is to provide the food dough spreading method according to the tenth aspect, wherein the spreading rollers are arranged so that at least three spreading rollers are opposite to each other and a distance between the spreading rollers positioned downside is smaller than a distance between the spreading rollers positioned upside.

A twelfth aspect of the present invention is to provide the food dough spreading method according to the tenth aspect, wherein when the pair of vibration applying members are operated to approach each other, a feed rate of the food dough by the spreading rollers is reduced to zero or to a low speed, and when the pair of vibration applying members are operated to be separated from each other, the feed rate of the food dough by the spreading rollers is increased than the feed rate of the food dough when the vibration applying members are operated to approach each other.

A thirteenth aspect of the present invention is to provide the food dough spreading method according to the tenth aspect, wherein reciprocative vibration of the pair of vibration applying members is set so that a separating operation speed is faster than an approaching operation speed.

A fourteenth aspect of the present invention is to provide the food dough spreading method according to the twelfth aspect, wherein a deceleration region is provided in a rotation speed of the spreading rollers.

A fifteenth aspect of the present invention is to provide the food dough spreading method according to the tenth aspect, wherein the vibration applying members are provided so as to stop temporarily at an open position where the vibration applying members are separated farthest from each other.

A sixteenth aspect of the present invention is to provide the food dough spreading method according to the tenth aspect, wherein when the food dough has been measured to a measurement value corresponding to a desired weight set beforehand, the food dough is cut by a measuring and cutting device provided between a transfer unit that transfers the food dough downward of the spreading rollers and a measuring conveyor provided on a downstream side thereof.

A seventeenth aspect of the present invention is to provide the food dough spreading method according to the sixteenth aspect, wherein a second measuring conveyor provided on a further downstream side of the measuring conveyor measures again a cut piece after being cut by the measuring and cutting device and transfers the measured food dough to a next step.

Advantageous Effects

According to the present invention, because the pair of vibration applying members provided between at least two opposite spreading rollers are position-adjustable, the width dimension of the food dough to be spread can be adjusted. Because the vibration applying members are reciprocatively vibrated in the longitudinal direction of the spreading rollers, the both side edges in the width direction of the food dough are repeatedly compressed and released. Therefore, application and release of the internal stress are repeated, and the internal stress does not remain in the food dough. Furthermore, by vibrating the vibration applying members, a relative movement (a flow) of the food dough with respect to the vibration applying member is smoothly performed.

BRIEF DESCRIPTION OF THE DRAWINGS

FIGS. 8(A), 8(B), and 8(C) are explanatory perspective views of food dough formed by the food dough spreading device according to the embodiment of the present invention and having a square shape, with a thickness thereof being the same but lengths of vertical and horizontal sides thereof being different in respective views.

FIGS. 9(A), 9(B), 9(C), and 9(D) are explanatory diagrams showing an operation of vibration applying members.

BEST MODE FOR CARRYING OUT THE INVENTION

Figure 1:
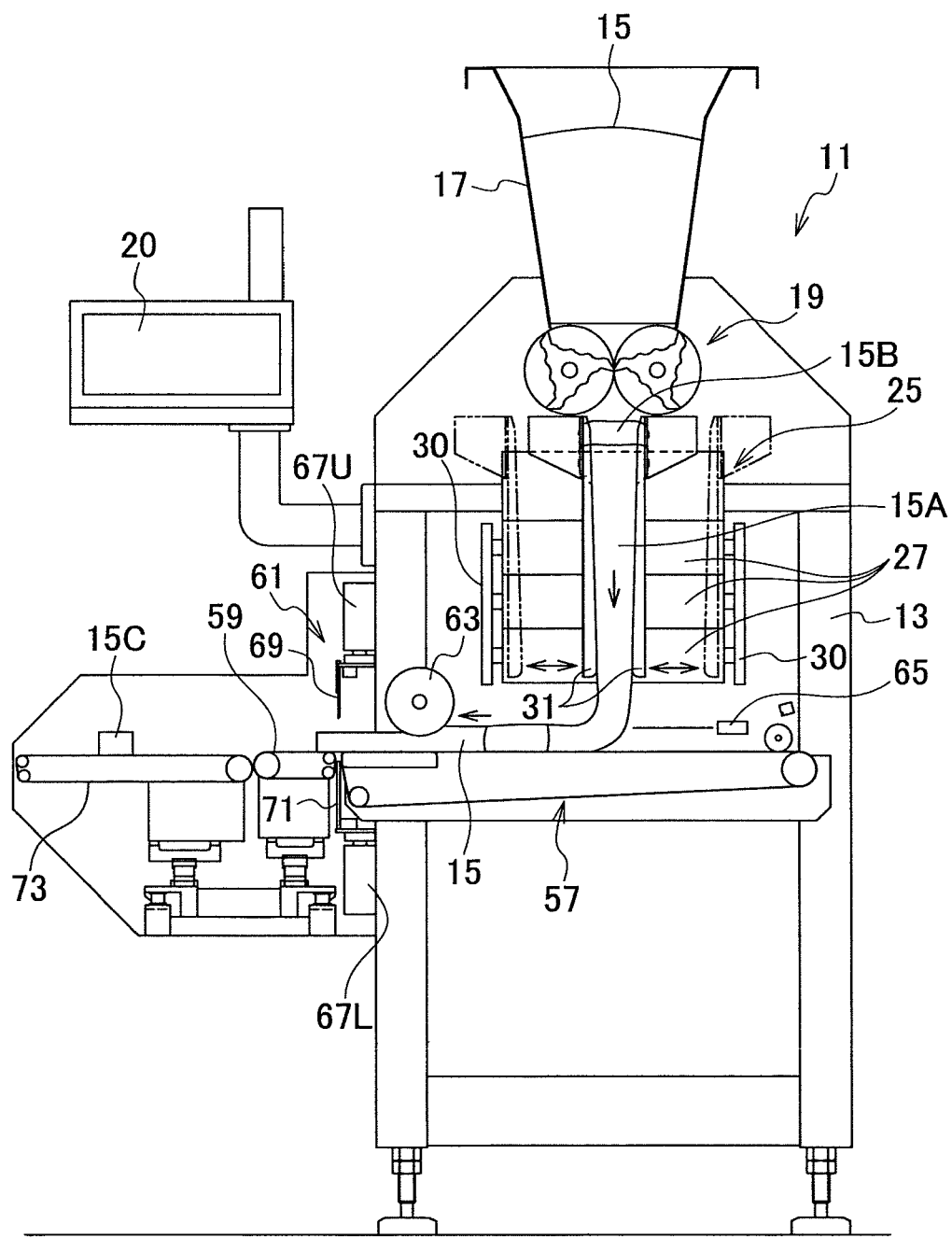
FIG. 1 is a front view conceptually and schematically showing a food dough spreading device according to an embodiment of the present invention.

A food dough spreading device according to an embodiment of the present invention will be explained with reference to the accompanying drawings. As shown conceptually and schematically in FIGS. 1 and 2, a food dough spreading device 11 according to the embodiment of the present invention includes a mount 13, and a box-shaped hopper 17 that stores therein arbitrary food dough 15, for example, bread dough is provided above the mount 13. At a position corresponding to an opening position at the bottom of the hopper 17, a cutting device 19 that cuts the food dough 15 supplied downward from the hopper 17 into a predetermined length is provided.

The food dough spreading device 11 is provided with a control device 20 formed of a computer in order to control the entire operation of the device.

The cutting device 19 cuts the food dough 15 into a length corresponding to the cutting device 19 by rotationally driving a motor 21 intermittently under control of the control device 20. Configurations of the hopper 17 and the cutting device 19 have been already known, and thus detailed explanations of the hopper 17 and the cutting device 19 will be omitted.

A belt conveyor 23 as a delivery unit that delivers (transfers) the long food dough 15, which has been cut into the predetermined length by the cutting device and has been dropped, in a longitudinal direction (leftward in FIG. 2) is provided below the cutting device 19. The belt conveyor 23 is driven to travel by a motor (not shown), and the transportation velocity of delivering the food dough 15 in the longitudinal direction can be controlled under control of the control device 20. The configuration of the belt conveyor 23 has been well known, and thus detailed explanations of the belt conveyor 23 will be omitted.

Figure 2:
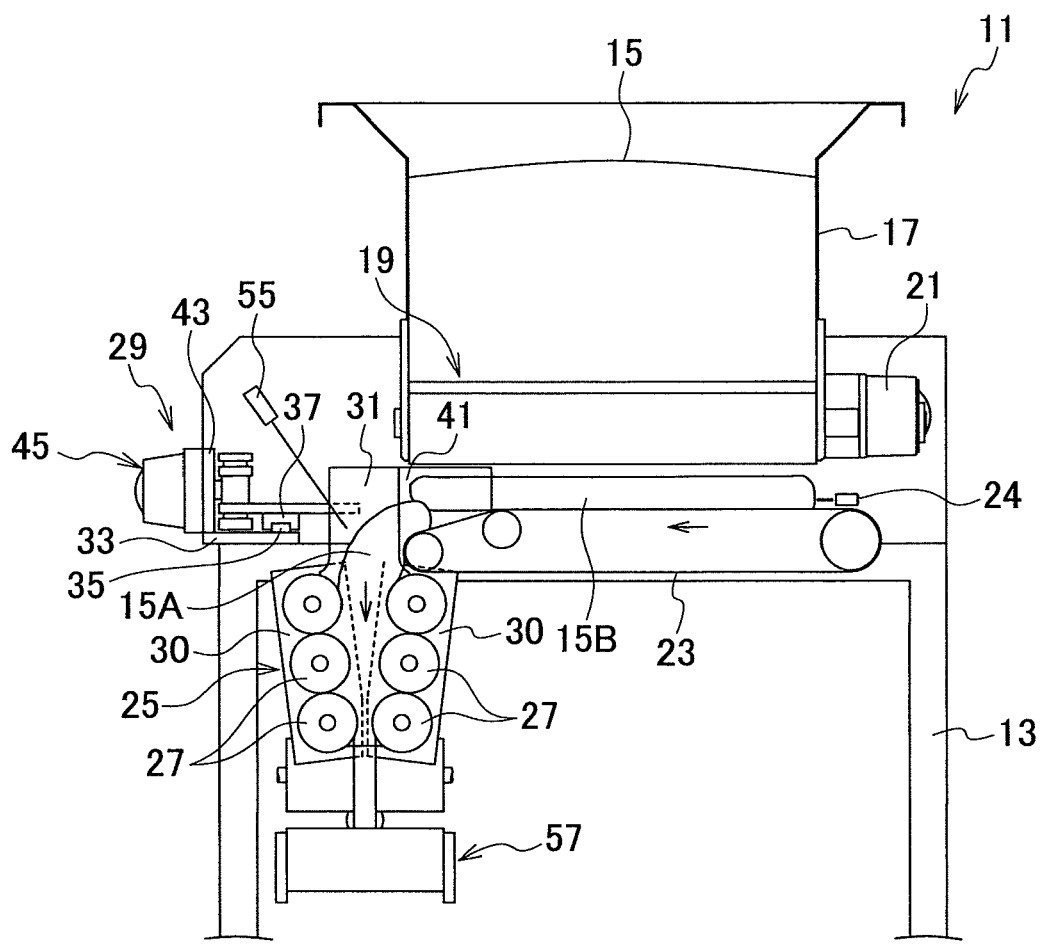
FIG. 2 is an explanatory side view of the food dough spreading device.

The food dough spreading device is provided with a rear-end detection sensor 24 that detects that a rear end of the food dough 15 is delivered to a predetermined position, when the food dough 15 on the belt conveyor 23 is delivered in the longitudinal direction and the rear end thereof is delivered to the predetermined position. When the rear-end detection sensor 24 detects the rear end of the food dough 15, the motor 21 is rotationally driven under control of the control device 20, and the next food dough 15 is cut and dropped onto the belt conveyor 23. As described above, when the next food dough 15 is cut by the cutting device 19 by the rotation of the motor 21, as shown in FIG. 2, a front end side of following food dough 15B overlaps on the rear end side of preceding food dough 15A. As a configuration of cutting the following food dough 15B sequentially by the cutting device 19, such a configuration is possible that the cutting device 19 is operated to cut the food dough 15 every time a set time set beforehand to a timer has passed.

Therefore, when the motor 21 in the cutting device 19 is rotationally driven intermittently to cut the food dough 15 supplied from the hopper 17 into a predetermined length and to drop the food dough 15 sequentially, the food dough 15 is continuously connected to be delivered in the longitudinal direction. In order to spread the food dough 15 delivered by the belt conveyor 23, a spreading unit 25 is provided corresponding to a position of a downstream end of the belt conveyor 23. That is, the spreading unit 25 is provided at a position to receive the food dough 15 delivered in the horizontal direction (leftward in FIG. 2) by the belt conveyor 23 and moved downward from the downstream end of the belt conveyor 23.

The spreading unit 25 is provided, as shown in FIG. 2, on the mount 13 at a position lower than the belt conveyor 23, and has such a configuration that a plurality of spreading rollers 27 are arranged in a V-shape so as to press an overlapping portion of the rear end side of the preceding food dough 15A and the front end side of the following food dough 15B from an overlapping direction. More specifically, the respective spreading rollers 27 are provided rotatably on a roller mount 30 fixed to the mount 13 in a V-shape. The respective spreading rollers 27 have a configuration in which the respective spreading rollers 27 coordinate with each other via an appropriate power transmission mechanism (not shown) such as a chain or a gear, and rotate faster toward the downstream side.

The spreading unit that spreads food dough 15 by arranging the plurality of spreading rollers 27 in a V-shape has been already known. However, the spreading unit 25 according to the present embodiment includes a vibration applying unit 29 (see FIG. 3) that applies vibration in a width direction to both side edges in the width direction (a horizontal direction in FIG. 1, a longitudinal direction of the spreading roller 27) of the food dough 15 spread by the spreading rollers 27.

Figure 3A:
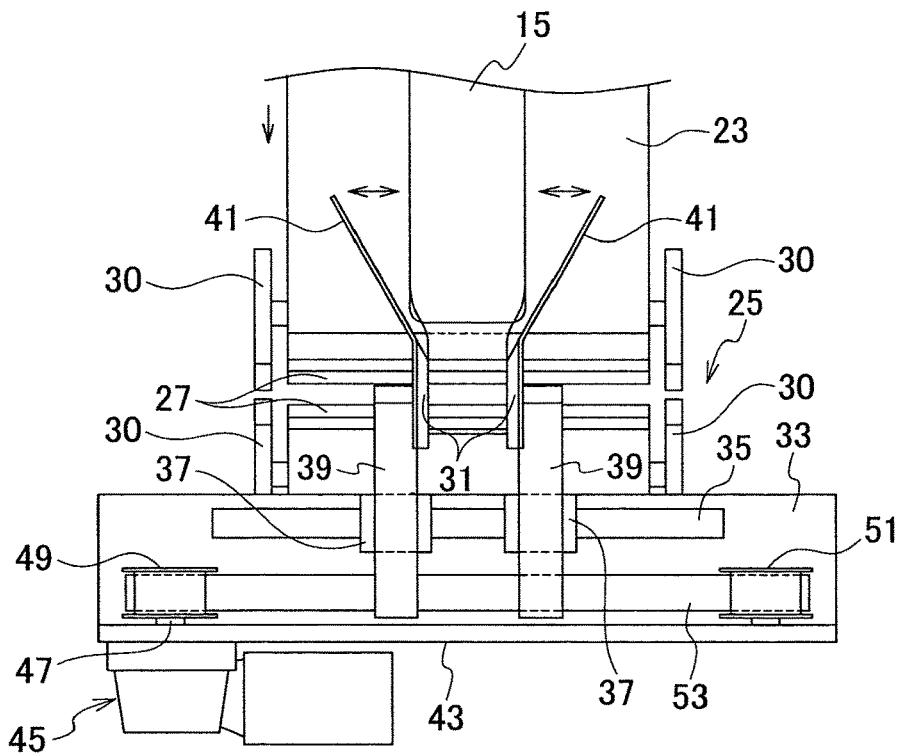
FIG. 3(A) is an explanatory diagram showing a configuration of a spreading unit as viewed in a planar view.

More specifically, a pair of vibration applying members 31 provided in the vibration applying unit 29 are provided, as shown in FIGS. 1 and 3, between the spreading rollers 27 arranged in a V-shape. The vibration applying members 31 are provided so that an opposite distance becomes narrower as moving downward, and the lower side of the vibration applying members 31 gradually becomes thicker. Because the vibration applying members 31 are provided movably in the direction approaching and separating from each other, the width of the food dough 15 can be regulated. At a position opposite to the downstream end (a delivery end) of the belt conveyor 23, in other words, at a position on an opposite side of the belt conveyor 23, putting the spreading unit 25 therebetween, a base plate 33 which is long in the longitudinal direction of the spreading roller 27 is integrally provided on the mount 13. Each of the vibration applying members 31 has a perimeter that matches the arrangement of the spreading rollers and is formed with a perimeter edge that matches and at least partially surrounds the curved perimeter of each of the spreading rollers.

A pair of sliders 37 are movably provided in a guide member 35 provided on the base plate 33. Coupling members 39 integrally coupled with the vibration applying members 31 are respectively fixed to the pair of sliders 37. Guide members 41 facing an upper side of the belt conveyor 23, with an upstream side thereof being widened gradually, are integrally provided on an upper part of the pair of vibration applying members 31.

A motor bracket 43 is integrally provided in a upright manner on one side of the base plate 33, in order to move the pair of vibration applying members 31 so as to approach or be separated from each other in the longitudinal direction of the spreading rollers 27. The motor bracket 43 is provided with a rotation drive device 45 such as a servo motor, and a drive pulley 49 such as a toothed pulley is provided on a rotation shaft 47 of the rotation drive device 45.

A driven pulley 51 is rotatably provided at a position away from the drive pulley 49, and an endless member 53 such as a toothed belt is wound around the driven pulley 51 and the drive pulley 49. One of the coupling members 39 is coupled with an upper side of the endless member 33 and the other of the coupling members 39 is coupled with a lower side of the endless member 53.

Figure 3B:
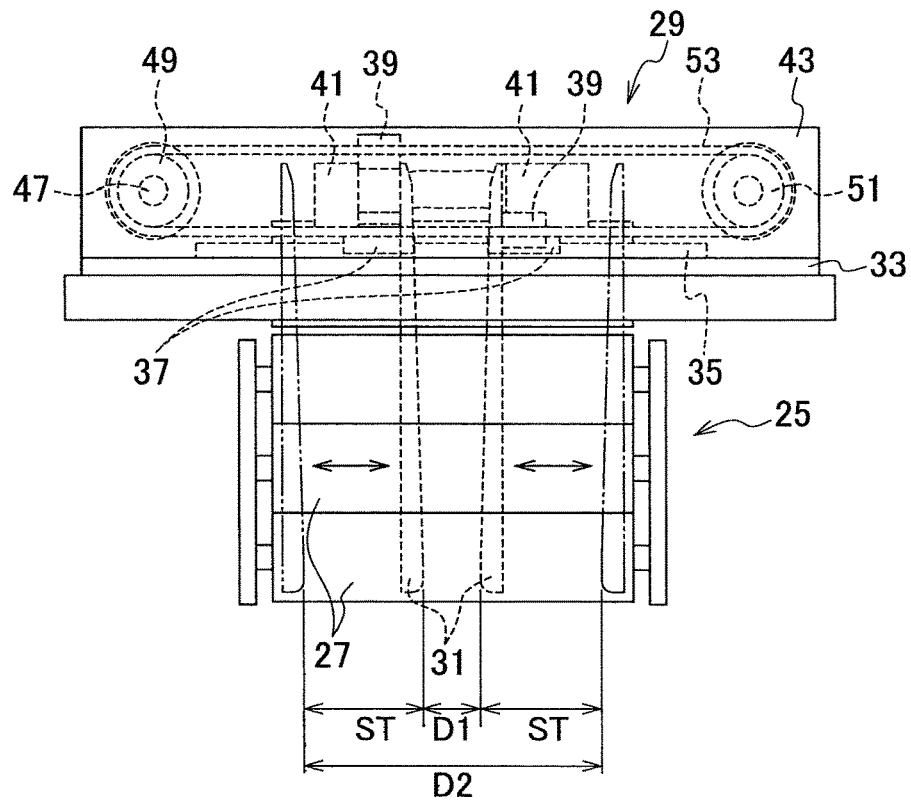
FIG. 3(B) is an explanatory diagram showing the configuration of the spreading unit as viewed in a front view.

As for the opposite distance at the lower side of the pair of vibration applying members 31, as shown in FIG. 3(B), it is assumed that the distance at a closed position where the vibration applying members 31 approach each other most closely is a closed distance D1, and the distance at a position where the vibration applying members 31 are separated farthest from each other is an open distance D2. It is also assumed that a distance in which the respective vibration applying members 31 are moved between the closed position and the open position is a stroke length ST. According to the configuration, the pair of vibration applying members 31 can be moved in the direction approaching and separating from each other by setting the closed distance D1 and the stroke length ST of the pair of vibration applying members (the width regulating members) 31 in the control device 20 and positively rotating or negatively rotating the rotation drive device 45 under control of the control device 20. Accordingly, by adjusting a movement position of the pair of vibration applying members 31, a width dimension of the food dough 15, which is subjected to a spreading action in the spreading unit 25, can be regulated to a desired dimension. Accordingly, the vibration applying members are position-adjustable in the longitudinal direction of the spreading rollers so as to adjust a most closed distance between the vibration applying members at a position where the width dimension of the food dough is adjusted. As is already understood, the vibration applying members 31 can freely regulate the width dimension of the food dough 15 to be spread, thereby constituting a certain type of vibration applying member. By adjusting the closed distance of the vibration applying members (the width regulating members) 31 between D1 to D3, the food dough in which cut pieces 15C of the food dough 15 have a square surface having the same thickness but having different lengths of vertical and horizontal sides from each other, as viewed in a planar view, can be formed as shown in FIGS. 8(A), 8(B), and 8(C).

Furthermore, according to the configuration, after the pair of vibration applying members 31 are positioned in order to regulate the width dimension of the food dough 15 to be spread, the vibration applying members 31 can be reciprocatively vibrated in the width direction (in the longitudinal direction of the spreading rollers 27) at a position where the positioning has been performed, by repeating positive and negative rotation of the rotation drive device 45 within a desired rotation range. Accordingly, vibration can be applied to the both side edges in the width direction of the food dough 15 which is being spread by the spreading rollers 27. Therefore, adhesion of the food dough 15 to the vibration applying members 31 can be prevented, thereby enabling to move the food dough 15 smoothly. Further, the food dough 15 surrounded by the pair of vibration applying members 31 and the spreading rollers 27 is alternately moved in the delivery direction (longitudinal direction in FIGS. 1 and 2) and the width direction by reciprocatively vibrating the vibration applying members 31 in the width direction, thereby enabling to improve spreading efficiency of the food dough 15 by the spreading rollers 27.

Figure 4:
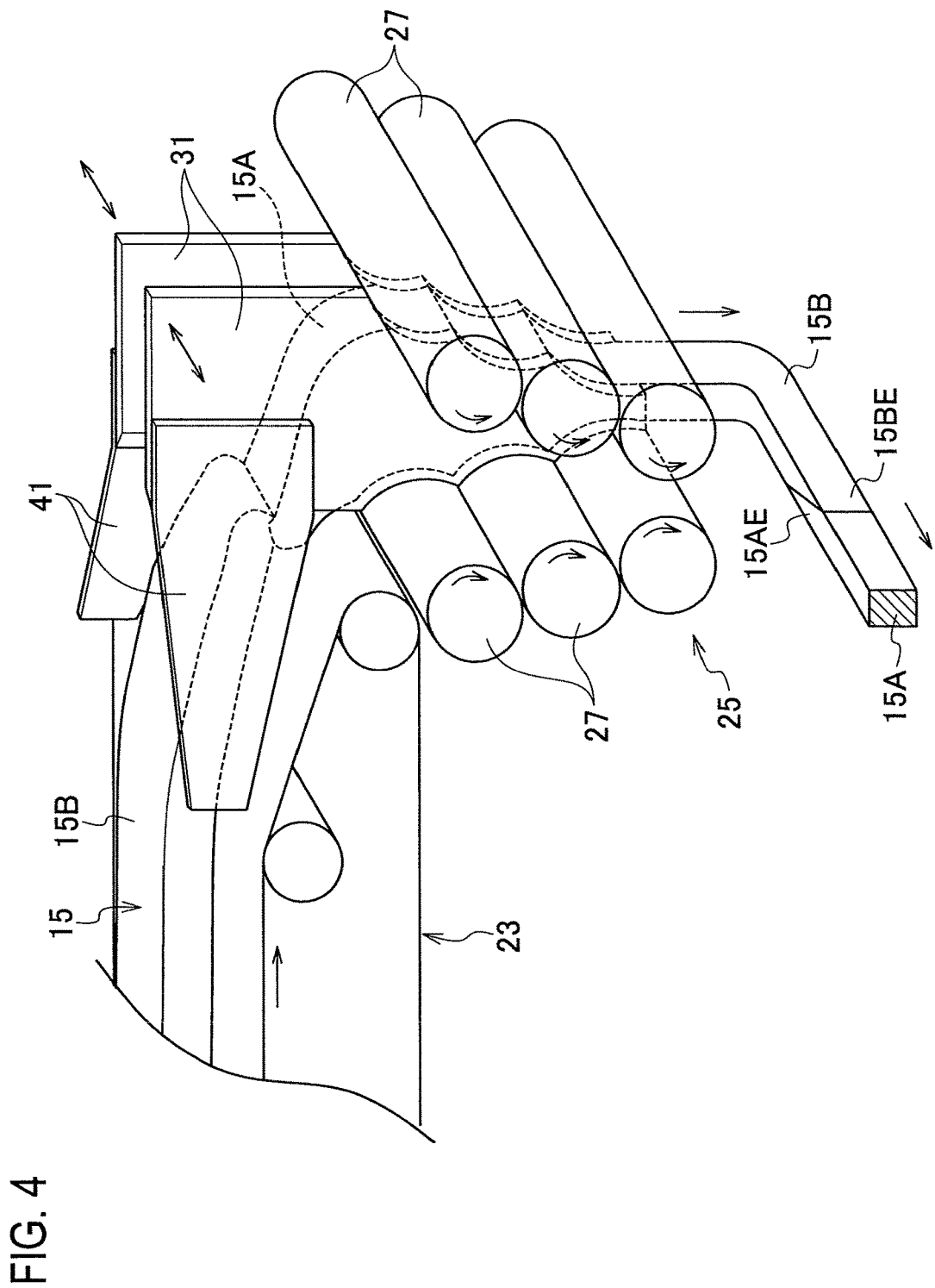
FIG. 4 is an explanatory perspective view showing the configuration of the spreading unit.

As shown in FIG. 4, when the food dough 15 to be gradually spread to be made thinner by the spreading rollers 27 is regulated by the vibration applying members 31, to apply vibration from both sides in the width direction, vibration can be applied to the entire food dough 15 in a portion subjected to the spreading action. Therefore, vibration can be applied to the entire portion of the food dough 15 subjected to the spreading action to be able to perform degassing.

In the case described above, degassing of the food dough 15 can be adjusted by controlling the positive and negative rotation of the rotation drive device 45 under control of the control device 20 to adjust the number of reciprocative vibration and the stroke length ST per unit time of the pair of vibration applying members 31. Accordingly, the food dough 15 having a high specific gravity can be acquired by increasing the number of reciprocative vibration to degas the food dough 15 more efficiently, or the food dough 15 having a low specific gravity can be acquired by decreasing the number of reciprocative vibration to reduce degassing.

Furthermore, the approaching operation speed and separating operation speed of the pair of vibration applying members 31 are set to be adjustable. As a specific example, the closed distance D1 is 15 millimeters, the stroke length ST is 15 millimeters, the open distance D2 is 45 millimeters, the approaching operation speed is 20 m/min, and the separating operation speed is 25 m/min. According to the configuration, by quickening (increasing) the approaching operation speed, the degassing effect can be improved. By quickening (increasing) the separating operation speed than the approaching operation speed, adhesion of the food dough 15 can be reduced, thereby promoting flow-down of the food dough 15. In other words, an effect by releasing the food dough 15 from the pair of vibration applying members 31 quickly can be achieved.

In addition to the configuration described above, the vibration applying members 31 are provided so that the vibration applying members 31 can be temporarily stopped in a state of being separated farthest from each other. When the vibration applying members 31 are shifted from the most closed state (the closed position) to the open state, the stop time is not set. However, when the vibration applying members 31 are shifted from the most opened state (the open position) to the closed state, the stop time is set. The stop time can be set arbitrarily, and a time of from about 0.5 to 2 seconds is most effective. If the stop time is short, the food dough 15 is compressed again in a state where the flow-down effect of the food dough 15 due to the release is small, and thus the food dough 15 cannot be dropped efficiently. Further, if the stop time is long, the effect of applying vibration to the food dough 15 decreases, thereby decreasing degassing efficiency and spreading efficiency.

When the pair of vibration applying members 31 are operated in the direction approaching each other, the feed rate of the food dough 15 by the spreading rollers 27 is controlled to a low speed or to stop the food dough 15 under control of the control device 20. When the pair of vibration applying members 31 are operated in the separating direction from each other, it is desired to control the operation of the spreading rollers 27 in the opposite manner. That is, when the pair of vibration applying members 31 are operated to be separated from each other, the feed rate of the food dough 15 by the spreading rollers 27 is set to be faster than the feed rate of the food dough 15 by the spreading rollers 27 when the vibration applying members 31 are operated to approach each other.

A relation between the rotation speed of the spreading rollers 27 and the approaching and separating operation of the vibration applying members 31 is explained below with reference to FIG. 9. A deceleration range in which the rotation speed of the spreading rollers 27 is decelerated is set in association with a movement position of the vibration applying members 31. In FIG. 9(A), the position where the pair of vibration applying members 31 are separated farthest from each other is indicated by a solid line, and the most approached position of the vibration applying members 31 is indicated by an imaginary line. As shown in FIG. 9(B), the rotation speed of the spreading rollers 27 is decelerated to 10% of the set speed, from the time when the pair of vibration applying members 31 are operated to approach each other and pass a position at a distance T1 from the most approached position. As shown in FIG. 9(C), the pair of vibration applying members 31 reach the most approached position, and then are operated to be separated immediately thereafter. As shown in FIG. 9(D), the rotation speed of the spreading rollers 27 is returned to the set speed, from the time when the pair of vibration applying members 31 are operated to be separated from each other and pass a position at a distance T2 from the most approached position. According to the configuration, the degassing effect is improved. Further, adhesion of the food dough 15 can be reduced, thereby promoting flow-down of the food dough 15.

The vibration applying members 31 have a function of regulating the movement of the food dough 15 to be subjected to the spreading action between the spreading rollers 27 arranged in a V-shape, in the width direction. Therefore, as shown in FIG. 4, the shape of the vibration applying members 31 matches with the V-shape of the spreading rollers 27.

The shape of the vibration applying members 31 is not particularly limited to this shape, and can be set according to conditions such as the property of the dough and a discharge width of the dough to be regulated. As a form in which the spreading rollers 27 are arranged in a V-shape, it suffices that the distance between the spreading rollers 27 located on the lower side is smaller than the distance between the spreading rollers 27 located on the upper side. For example, a diameter of the lower side spreading rollers 27 can be set larger than that of the upper side spreading rollers 27. A configuration in which the spreading rollers 27 face each other horizontally or a configuration in which the spreading rollers 27 are arranged in a zig-zag shape can be adopted.

As described above, a carrying state detection sensor 55 (see FIG. 2) that detects the carrying state of the food dough 15 to the spreading unit 25 is provided in order to control the transportation velocity of the belt conveyor 23 appropriately when the spreading action of the food dough 15 is performed in the spreading unit 25. The detection sensor 55 is, for example, a distance detection sensor using a laser beam, and detects a raised state of the food dough 15 near an entrance of the spreading unit 25.

That is, when the detection sensor 55 has detected a bump larger than a bump of the food dough 15 in a normal state, the transportation velocity of the belt conveyor 23 is controlled to be low by the control device 20. When the bump of the food dough 15 is smaller than that in the normal state, the transportation velocity of the belt conveyor 23 is controlled to be higher than that in the normal state. That is, the transportation velocity of the belt conveyor 23 is controlled appropriately corresponding to the spreading speed of the spreading unit 25.

Figure 5A:
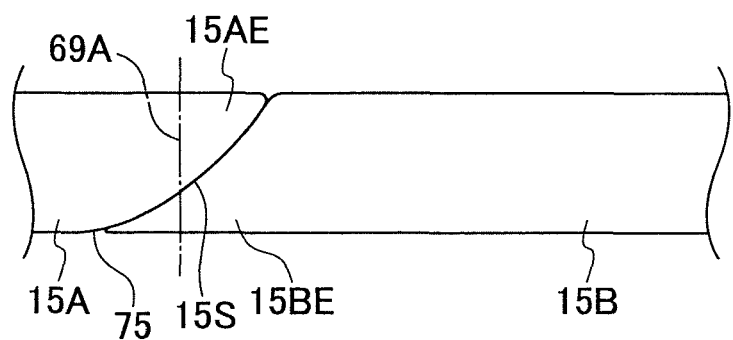
FIG. 5(A) shows an overlapping relation between a rear end side of preceding food dough and a front end side of following food dough in the food dough.
Figure 5B:
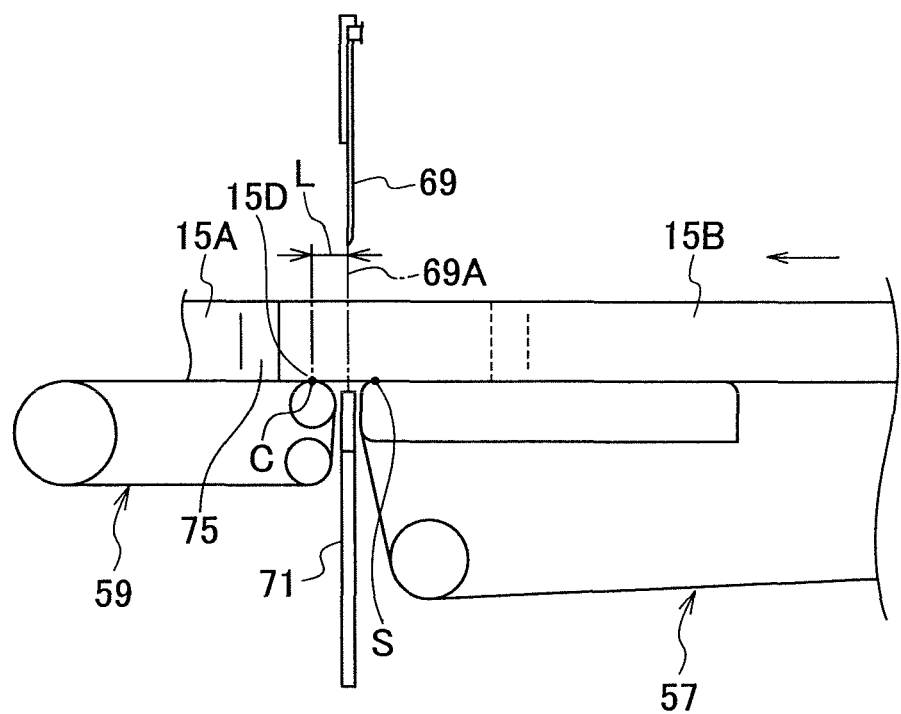
FIG. 5(B) is an explanatory diagram when the overlapping relation between the rear end side of the preceding food dough and the front end side of the following food dough is converted to a horizontal relation to perform cutting of the food dough.

As shown in FIGS. 1, 5(A) and 5(B), the food dough 15 spread to a predetermined thickness and predetermined width dimension by the spreading unit 25 is transferred to a measuring conveyor (a weighing conveyor) 59 constituting a measuring and cutting device by a transfer unit 57 provided at a position below the spreading unit 25. When the food dough 15 is weighed to a predetermined weight set beforehand by the measuring conveyor 59, the food dough 15 is cut by a cutter device 61 which is another element constituting the measuring and cutting device. The transfer unit 57 is constituted by a transfer conveyor such as a belt conveyor, and a transfer direction of the transfer conveyor 57 is set to a direction orthogonal to (a direction intersecting) the transfer direction of the belt conveyor 23.

More specifically, the delivery direction of the food dough 15 by the belt conveyor 23 is a horizontal direction in FIG. 2, and the transfer direction by the spreading unit 25 is a vertical direction. The transfer direction of the food dough 15 by the transfer conveyor 57 is a direction orthogonal to the drawing of FIG. 2. That is, the transfer directions of the food dough 15 by the belt conveyor 23, the spreading unit 25, and the transfer conveyor 57 are orthogonal to each other.

Therefore, an overlapping direction of the preceding food dough 15A and the following food dough 15B is vertical overlap on the belt conveyor 23, and at a position of the spreading unit and on the transfer conveyor 57, the overlapping direction is changed to right and left (lateral, horizontal) overlap in FIG. 2. Therefore, the belt conveyor 23, the spreading unit 25, the transfer conveyor 57 and the like constitute a certain type of overlapping-relation converting unit that changes the overlapping relation between the rear end side of the preceding food dough 15A and the front end side of the following food dough 15B from a vertical relation to a lateral relation (a horizontal overlapping relation).

A smoothing roller 63 (see FIG. 1) that smoothes the thickness of the food dough 15 transferred by the transfer conveyor 57 to a certain thickness is rotatably provided on an upper side near the downstream end of the transfer conveyor 57. Further, on an upstream side of the transfer conveyor 57, a bend-section detection sensor 65 that detects a change of a bent section of the food dough 15 transferred from the spreading unit 25 to the transfer conveyor 57 to the transfer direction of the transfer conveyor 57 is provided.

The bend-section detection sensor 65 is a distance detection sensor similar to the detection sensor 55. When a detected distance of the food dough 15 to the bent section is larger than a set value set beforehand, the transfer speed of the transfer conveyor 57 is controlled to a lower speed, or the transfer speed of the spreading unit 25 is controlled to a higher speed. When the detected distance is smaller than the set value, the transfer speed of the transfer conveyor 57 is controlled to a higher speed and the transfer speed of the spreading unit 25 is controlled to a lower speed. That is, the configuration is that, in a relation between the transfer speed of the spreading unit 25 and the transfer speed of the transfer conveyor 57, the speeds are controlled to be appropriate.

When the food dough 15 is transferred from the transfer conveyor 57 and is placed on the measuring conveyor 59 provided on the downstream side, and is measured to a measurement value corresponding to the desired weight set beforehand, the food dough 15 is cut by the cutter device 61 arranged between the transfer conveyor 57 and the measuring conveyor 59. The cutter device 61 includes upward and downward actuators 67U and 67L such as a fluid pressure cylinder placed on the mount 13, so as to face each other vertically. The upward and downward actuator 67U on the upper side is provided with a cutting blade 69 so as to be able to move vertically. The upward and downward actuator 67L on the lower side is provided with a support member 71 that supports the food dough 15 from below, facing the cutting blade 69 so as to be able to move vertically.

Therefore, when the food dough 15 is cut by the cutting blade 69 in the cutter device 61, a portion to be cut of the food dough 15 is supported from below by the support member 71. The cutting blade 69 comes in contact with an upper surface of the support member 71, to cut the food dough 15. Accordingly, the food dough 15 does not fall over downward in a lower part of the cut surface.

According to the configuration described above, a cut position 69A (see FIG. 5) by the cutter device 61 can be set as close as possible to an upstream end side of the measuring conveyor 59. Therefore, a region from the cut position 69A of the cutter device 61 to a position 15D (a measurement start position C in the measuring conveyor 59) where the food dough 15 first comes in contact with the measuring conveyor 59, that is, a region where the weight is predicted in a state with the food dough 15 being floating (a predicted cut region) can be made shorter. Accordingly, measurement accuracy by the measuring conveyor 59 can be further improved.

The cut piece 15C after the food dough 15 is measured by the measuring conveyor 59 and is cut by the cutter device 61 shown in FIG. 1 is measured again by a second measuring conveyor 73 arranged on the downstream side of the measuring conveyor 59, and is transferred to the next process. The second measuring conveyor 73 is for confirming whether the weight of the cut piece 15C which has been cut according to the measurement result of the measuring conveyor 59 is accurate. When the weight of the cut piece 15C is different from the set value of the predetermined weight set beforehand, the measurement value by the measuring conveyor 59 is corrected by the control device 20 so that cutting by the cutter device 61 is performed accurately. Therefore, the cut piece 15C is accurately cut in a range having less error at all times with respect to the weight of the set value set beforehand.

As described above, if the overlapping relation between a rear end side 15AE (see FIG. 5) of the preceding food dough 15A and a front end side 15BE of the following food dough 15B is converted from the vertical relation to the lateral relation (the horizontal relation) by the overlapping-relation converting unit, the overlapping relation between the rear end side 15AE of the preceding food dough 15A and the front end side 15BE of the following food dough 15B becomes the horizontal relation, and a connecting surface 15S thereof is transferred to the measuring conveyor 59 in a vertically extending state. The rear end side 15AE and the front end side 15BE adhere and are connected to each other by the spreading action of the spreading unit 25, and the connecting surface 15S is formed in an inclined state (not inclined vertically but inclined horizontally with respect to the transfer direction) from the preceding food dough 15A toward the following food dough 15B. Further, a small depression 75 may be generated between a front end portion of the front end side 15BE and a side surface of the preceding food dough 15A. However, a lower surface of the food dough 15 placed on the transfer conveyor 57 and the weighing conveyor 59 in the overlapping portion, that is, a surface pressed by the vibration applying members 31 is formed in a smooth surface, and a depression such as the depression 75 is not formed on the lower surface of the food dough 15.

A case where the cut position 69A by the cutting blade 69 in the cutter device 61 is set at a position of the depression 75 or at a position close to the depression 75 is explained here. In this case, the depression 75 is on the side surface of the food dough 15, not at a position facing a delivery surface of the measuring conveyor 59. However, the overlapping portion of the food dough 15 is placed on an upper surface of the measuring conveyor 59 or is in a state close thereto.

A portion (of a distance L) of the food dough 15 from the cut position 69A to the contact position 15D where the food dough 15 first comes in contact with the measuring conveyor 59 and a portion of the food dough 15 from the cut position 69A to a separating position S at which the food dough 15 is separated from the transfer conveyor 57 are in a floating state. Therefore, the weight of the food dough 15 in the portion corresponding to the distance L is not measured actually but is calculated based on the measurement value of the measuring conveyor 59, and thus the portion becomes a predicted cut region. Although the rear end side 15AE and the front end side 15BE adhere and are connected to each other with the inclined surface 15S serving as a boundary, because the overlapping relation of the rear end side 15AE and the front end side 15BE is the horizontal relation, the rear end side 15AE and the front end side 15BE are directly placed on the measuring conveyor 59, and the weight of the food dough 15 acts downward to the measuring conveyor 59.

Accordingly, a measurement error of the food dough 15 by the measuring conveyor 59 can be reduced, and an error in a predicted weight in the predicted cut region can be suppressed further, as compared to a case where the front end side 15BE overlaps on an upper side of the rear end side 15AE.

Even when the food dough 15 is cut at the position of the depression 75 or at the position close to the depression 75, the contact position 15D of the food dough 15 can be matched with the measurement start position C of the measuring conveyor 59 by forming the surface of the food dough 15 placed on the measuring conveyor 59 in a smooth surface. Accordingly, the length of the distance L is stabilized, and the cut piece 15C can be cut with a more accurate weight.

Figure 6:
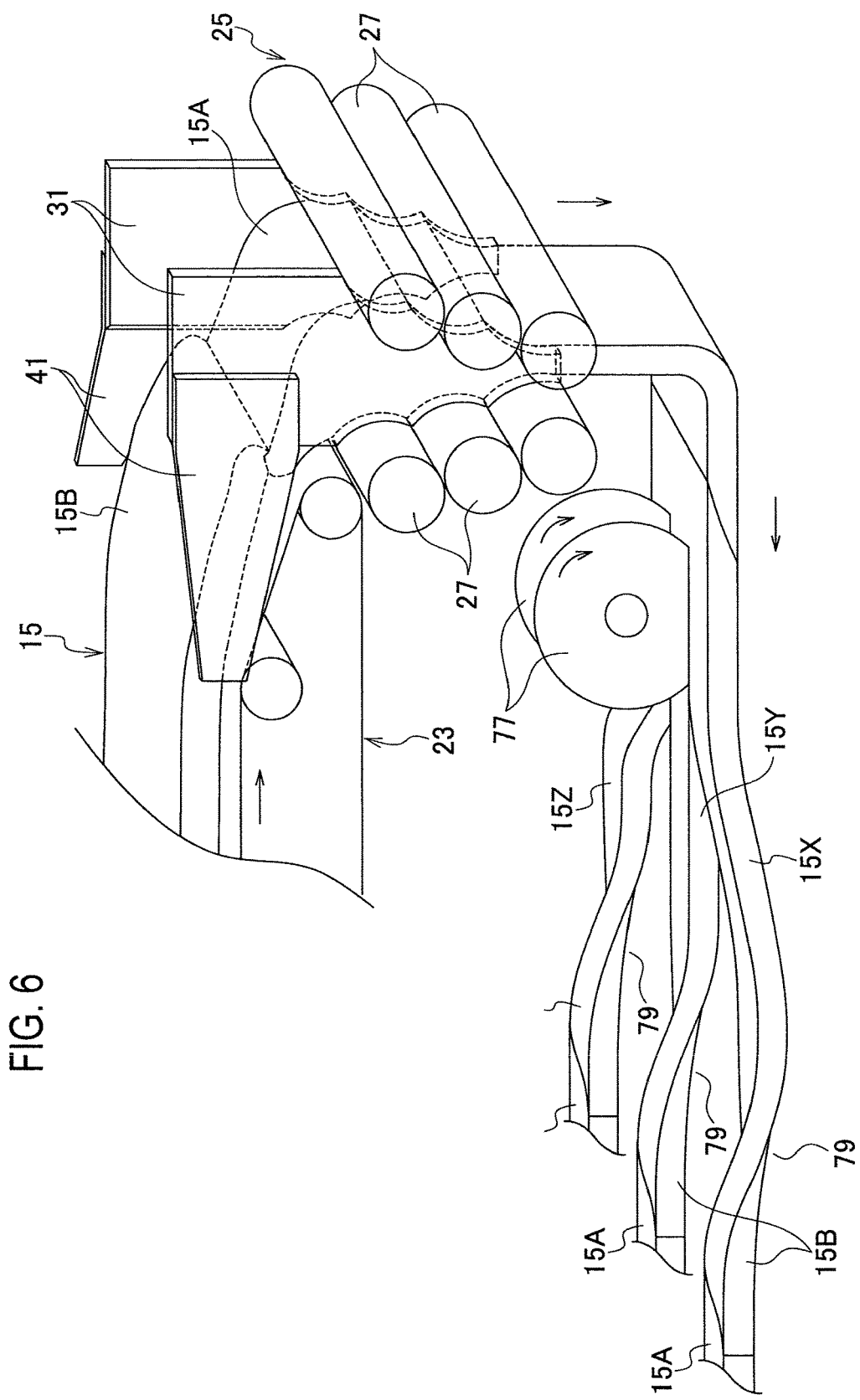
FIG. 6 is an explanatory diagram when food dough having a large width dimension is divided into a plurality of rows and the overlapping relation is converted to the horizontal relation.

FIG. 6 shows a second embodiment. In the second embodiment, a case where the width dimension of the food dough 15 is set large as compared to the thickness of the food dough 15. The transfer direction of the food dough 15 by the transfer conveyor 57 is leftward in FIG. 6, which is an opposite direction to the transfer direction of the food dough by the belt conveyor 23. By causing one or a plurality of cutting devices such as a disk-shaped cutter 77 as shown in FIG. 6 to abut on the lowermost spreading roller 27, the food dough 15 spread by the spreading unit 25 can be divided into two rows or more. In the second embodiment, after the food dough 15 on the transfer conveyor 57 is divided into a plurality of rows (for example, three rows) of food dough 15X, 15Y, and 15Z by the plurality of (for example, two in FIG. 6) disk-shaped cutters 77 arranged with a required distance in a direction orthogonal to the transfer direction (in the width direction), an overlapping-relation converting unit 79 converts the overlapping relation between the rear end side 15AE of the preceding food dough 15A and the front end side 15BE of the following food dough 15B from the vertical relation to the horizontal (lateral) relation, and transfers the food dough 15. The food dough 15 divided into the respective rows is measured to a predetermined weight set beforehand by each measuring conveyor 59, and is cut into the cut piece 15C by each cutting blade 69 for each row.

In the above embodiments, the front end side 15BE of the following food dough 15B is laminated on the upper surface of the rear end side 15AE of the preceding food dough 15A by the cutting device 19 to form a vertical overlapping portion. As described above, when the overlapping-relation converting unit converts the overlapping relation between the rear end side 15AE (see FIG. 5) of the preceding food dough 15A and the front end side 15BE of the following food dough 15B from the vertical relation to the lateral (horizontal) relation, the overlapping relation of the rear end side 15AE of the preceding food dough 15A and the front end side 15BE of the following food dough 15B becomes the horizontal relation. The connecting surface 15S thereof is transferred to the measuring conveyor 59 in a vertically extending state. The portion (the distance L) from the cut position 69A to the contact position 15D where the food dough 15 first comes in contact with the measuring conveyor 59 and the portion from the cut position 69A to the separating position S at which the food dough 15 is separated from the transfer conveyor 57 are in a floating state. However, the rear end side 15AE and the front end side 15BE are directly placed on the measuring conveyor 59 and the weight of the food dough 15 acts on the measuring conveyor 59 in the vertical direction. Accordingly, a measurement error of the food dough 15 by the measuring conveyor 59 can be reduced, as compared to the case where the front end side 15BE is overlapped on an upper side of the rear end side 15AE.

Figure 7:
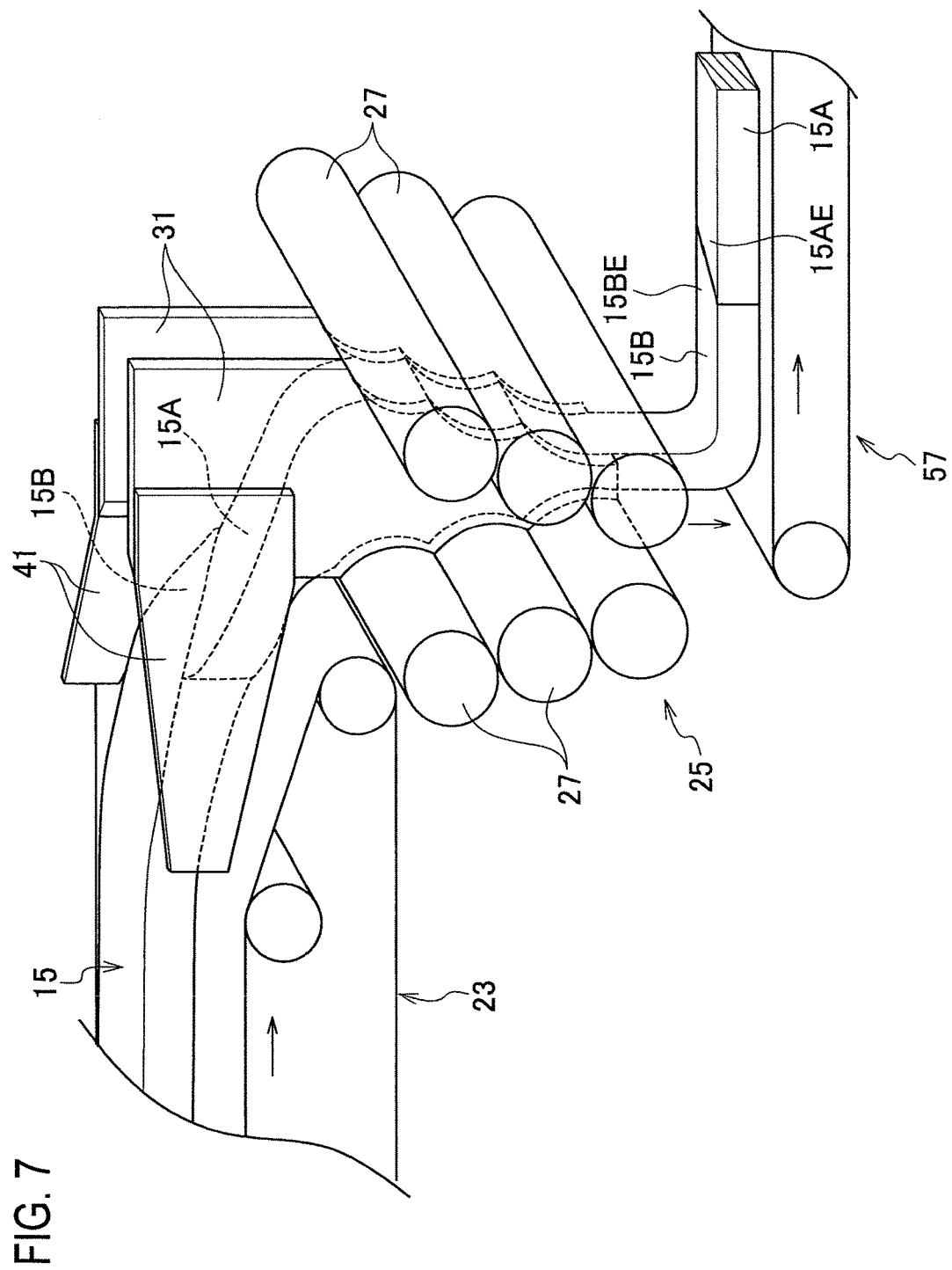
FIG. 7 is an explanatory perspective view showing a configuration of a spreading unit according to a third embodiment.

FIG. 7 shows a third embodiment. As shown in FIG. 7, the rear end side 15AE and the front end side 15BE can be placed beforehand so as to be overlapped on each other horizontally on the belt conveyor 23 and can be overlapped so as to adhere and be connected to each other. In the third embodiment, the transfer direction of the food dough 15 by the transfer conveyor 57 is rightward in FIG. 7, and is the same direction as the transfer direction of the food dough by the belt conveyor 23. Accordingly, an overlapping portion formed by laminating the front end side 15BE of the following food dough 15B on an upper surface of the rear end side 15AE of the preceding food dough 15A by the cutting device 19 is maintained as it is and is delivered.

Figure 10:
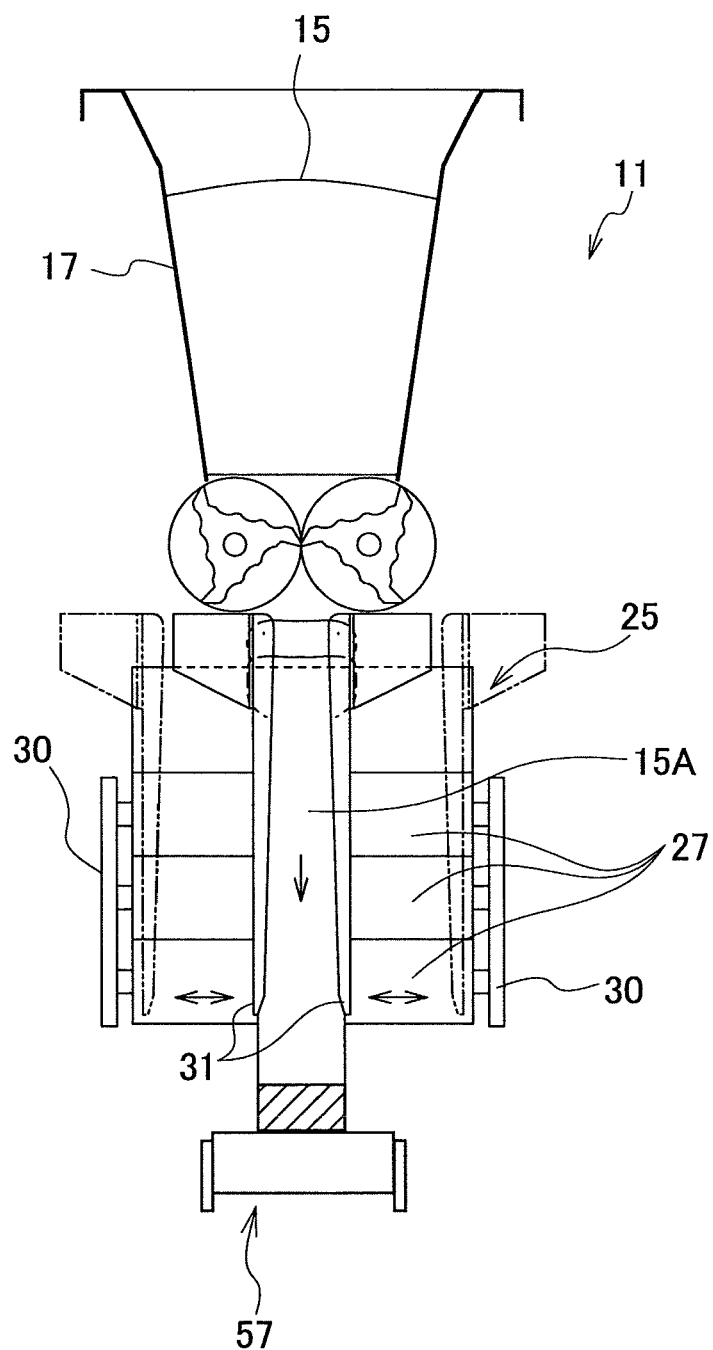
FIG. 10 is an explanatory diagram showing a configuration of a spreading unit according to a fourth embodiment.

FIG. 10 shows a fourth embodiment. In the vibration applying members (the width regulating members) 31, an inclination of the opposite faces can be formed in a truncated shape, as shown in FIG. 10. FIG. 10 is an explanatory diagram schematically showing another form of the vibration applying members (width regulating members) 31. In the first embodiment, it has been explained that the vibration applying members (the width regulating member) 31 face each other, as shown in FIGS. 1 and 3, so that an opposite distance becomes narrower as moving downward and the lower side of each vibration applying member 31 gradually becomes thicker. On the contrary, the vibration applying members 31 can be provided so that the opposite distance becomes wider as moving downward and the lower side of each vibration applying member 31 gradually becomes thinner. When such a pair of vibration applying members 31 are operated to approach each other to compress the food dough 15, a component force that presses the food dough 15 downward acts thereon, to promote flow-down of the food dough 15. The vibration applying members 31 are effective in spreading relatively hard pizza dough or the like. In the first embodiment shown in FIG. 1, the transfer direction of the food dough 15 by the transfer conveyor 57 is leftward in FIG. 1. However, in the fourth embodiment, the transfer direction of the food dough 15 by the transfer conveyor 57 is vertical to the drawing of FIG. 10, and the food dough 15 is transferred in a direction protruding this way from the drawing.

An embodiment whose mode is partially changed so that the food dough 15 which is spread or is spread to be divided into a plurality of rows is delivered in a state of being overlapped on each other vertically, without using the overlapping-relation converting unit 79 is explained.

Figure 11:
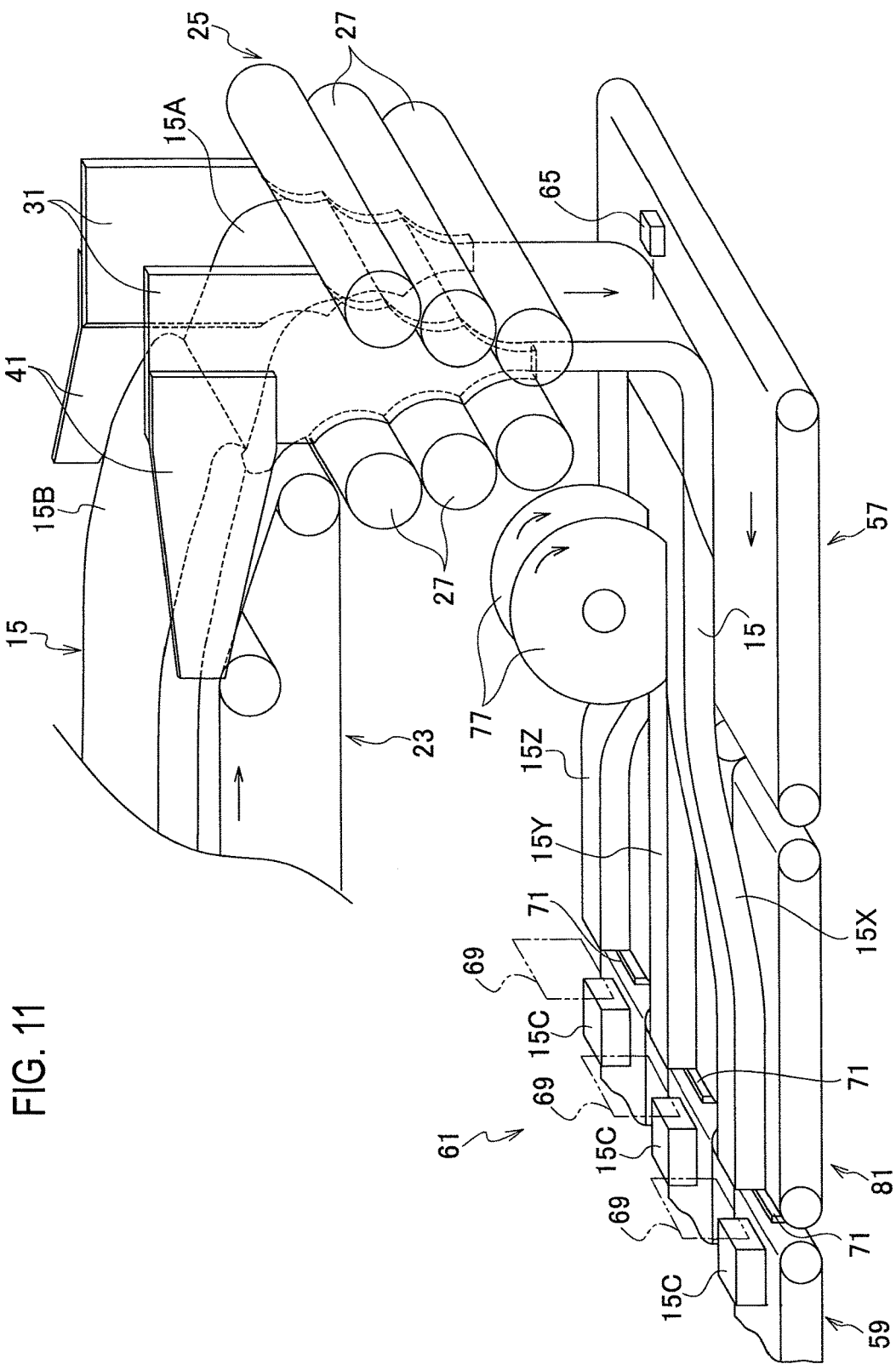
FIG. 11 is an explanatory perspective view showing a configuration of a spreading unit according to a fifth embodiment.

FIG. 11 shows a fifth embodiment. The fifth embodiment shows a case where the food dough 15 is transferred in a state with the overlapping relation of the rear end side 15AE of the preceding food dough 15A and the front end side 15BE of the following food dough 15B being maintained in the vertical relation, without using the overlapping-relation converting unit 79 in the second embodiment shown in FIG. 6. Three spacing and delivering devices 81 are arranged in parallel on the downstream side of the transfer conveyor 57. The spacing and delivering devices 81 are delivery conveyors that respectively space the food dough 15X, 15Y, and 15Z divided by the cutter 77 in the width direction and transfer the food dough 15 for each row. Further, three measuring conveyors 59 and second measuring conveyors (not shown) similar to those in the first embodiment are continuously installed for each row on the downstream side of each of the spacing and delivering devices 81. The cutter device 61 including three cutting blades 69 is provided between the respective spacing and delivering devices 81 and the respective measuring conveyors. The bend-section detection sensor 65 that detects a change in the transfer direction of the transfer conveyor 57, of the bend section of the food dough 15 transferred from the spreading unit 25 to the transfer conveyor 57 is provided on an upstream side of the transfer conveyor 57 (on the right side in FIG. 11). The support members 71 are respectively arranged between the three spacing and delivering devices 81 arranged in parallel and the three measuring conveyors 59 arranged in parallel. The support members 71 support the food dough 15X, 15Y, and 15Z, respectively when the food dough 15X, 15Y, and 15Z are respectively cut by the three cutting blades 69.

Figure 12:
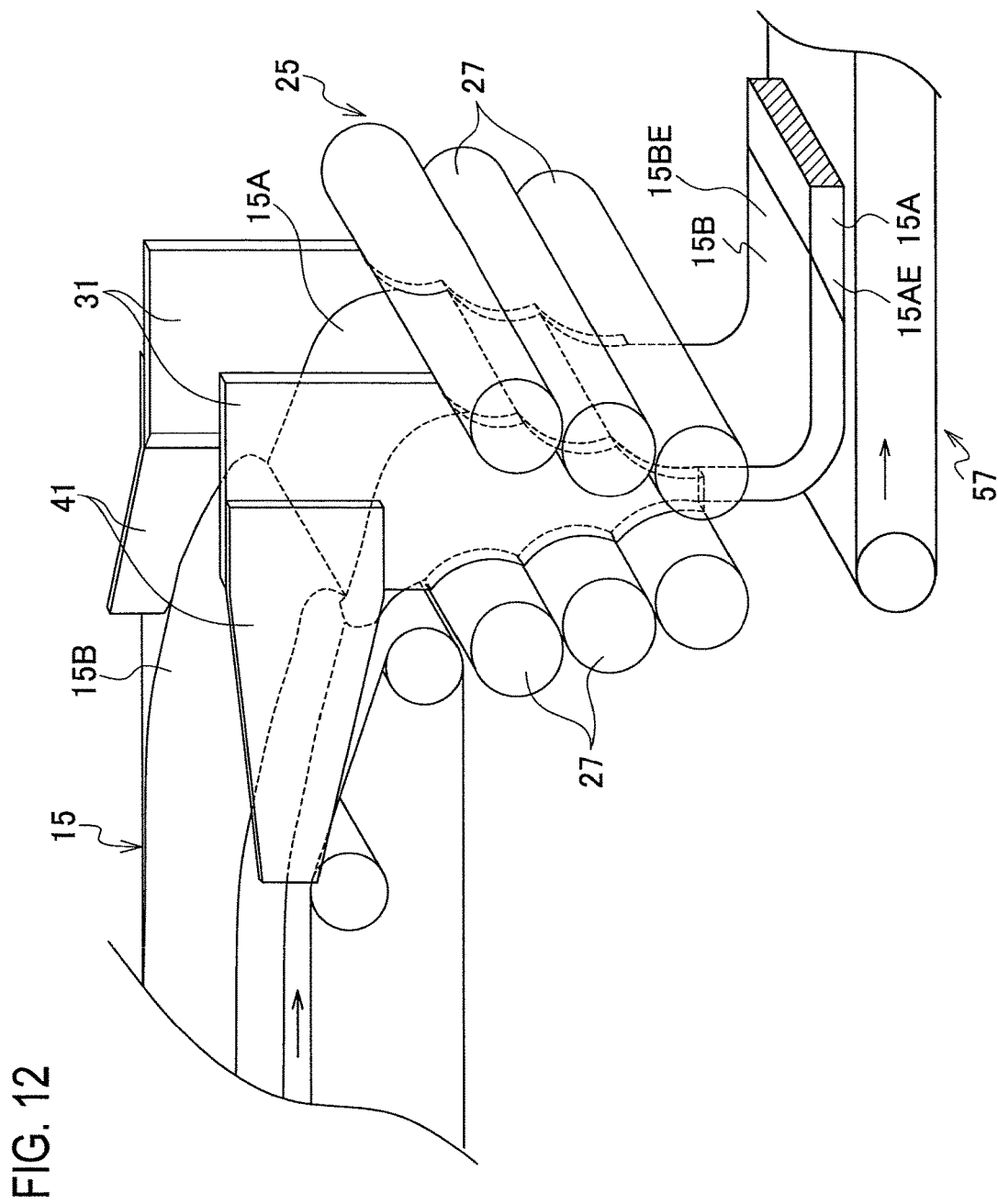
FIG. 12 is an explanatory perspective view showing a configuration of a spreading unit according to a sixth embodiment.

FIG. 12 shows a sixth embodiment. In the sixth embodiment, the transfer direction of the food dough 15 by the transfer conveyor 57 is rightward in FIG. 12, and is the same direction as the transfer direction of the food dough by the belt conveyor 23. Accordingly, the overlapping portion formed by laminating the front end side 15BE of the following food dough 15B on the upper surface of the rear end side 15AE of the preceding food dough 15A by the cutting device 19 is maintained as it is and is delivered.

Figure 13:
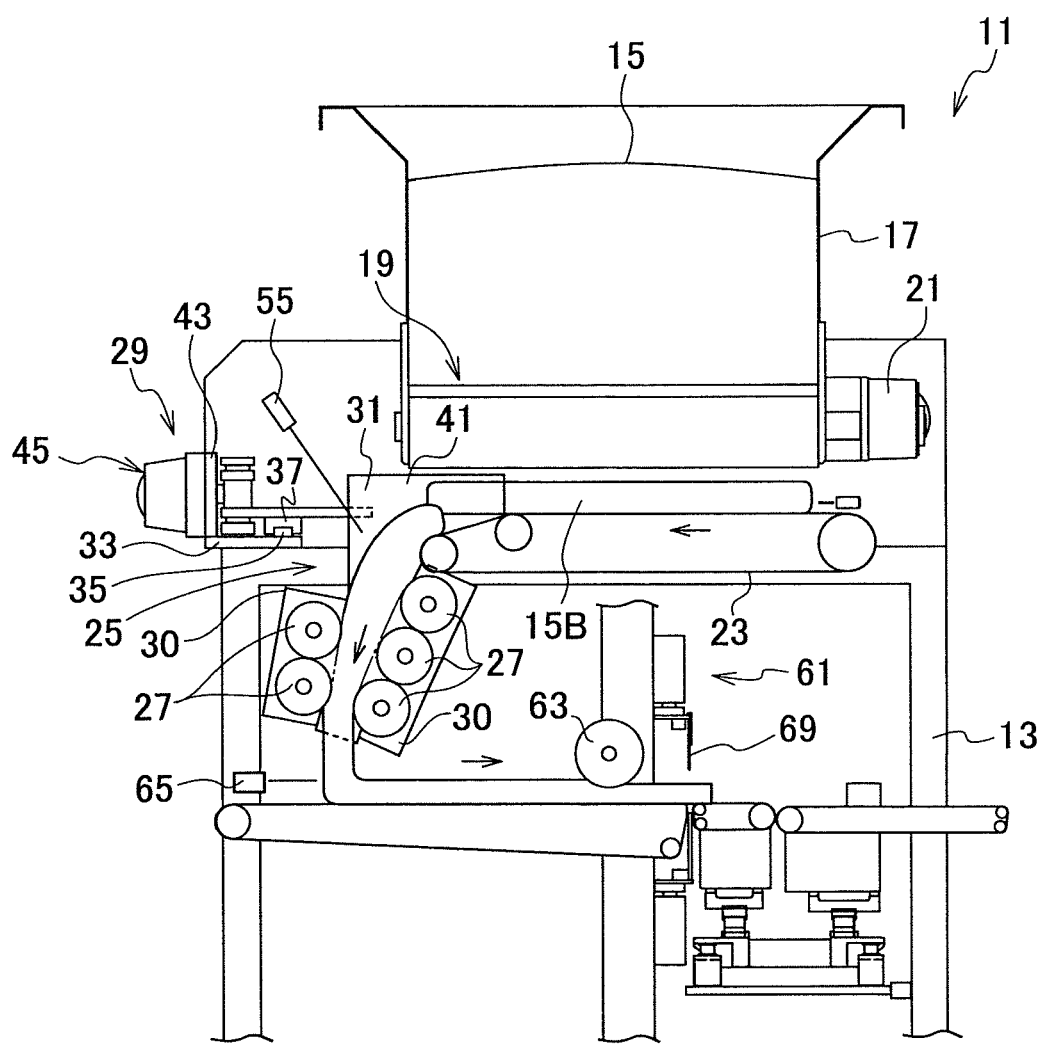
FIG. 13 is an explanatory diagram showing a configuration of a spreading unit according to a seventh embodiment.

FIG. 13 shows a seventh embodiment. A flow direction of the food dough 15 can be not only the vertical direction but also a direction inclined to the horizontal direction. Further, the inclination angle thereof can be adjustable within a range of, for example, from 45° to 90°. As shown in FIG. 13, a height of a region occupied by the spreading unit 25 can be set low by arranging the plurality of opposite spreading rollers 27 so that the flow of the food dough 15 is inclined. Accordingly, the height of the entire food dough spreading device 11 can be set low, thereby enabling to facilitate supply of the food dough 15.

Figure 14:
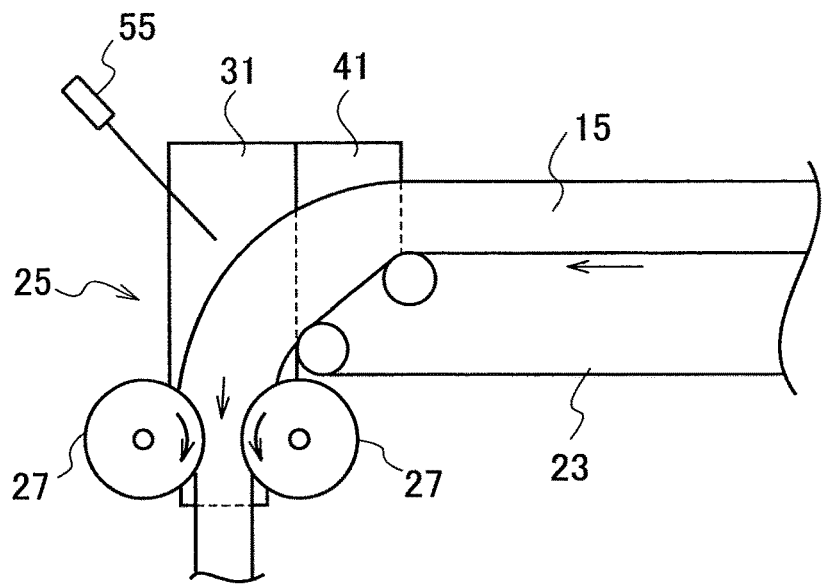
FIG. 14 is an explanatory diagram showing a configuration of a spreading unit including two opposite spreading rollers.

As described above, the spreading rollers 27 can be configured with one pair of opposite rollers (two) or with a relation in which one roller opposes three rollers, and the like. According to the present invention, when the food dough 15 supplied through the opposite spreading rollers 27 is spread and made to be thinner, the width dimension of the food dough 15 to be spread can be adjusted by reciprocatively vibrating the pair of vibration applying members (the width regulating members) 31 provided between the spreading rollers 27 in the width direction (the longitudinal direction of the spreading rollers 27) so as to be operated to approach and be separated from each other. Further, the both side edges in the width direction of the food dough are repeatedly subjected to compression and release, and application and release of the internal stress are repeated, so that the internal stress does not remain therein. Further, by vibrating the vibration applying members (the width regulating members) 31, a relative movement (a flow) of the food dough with respect to the vibration applying members (the width regulating members) 31 is performed smoothly. Accordingly, as for the number of the spreading rollers 27, the effects of the present invention described above can be achieved by providing at least two opposite spreading rollers 27 as shown in FIG. 14.

Figure 15:
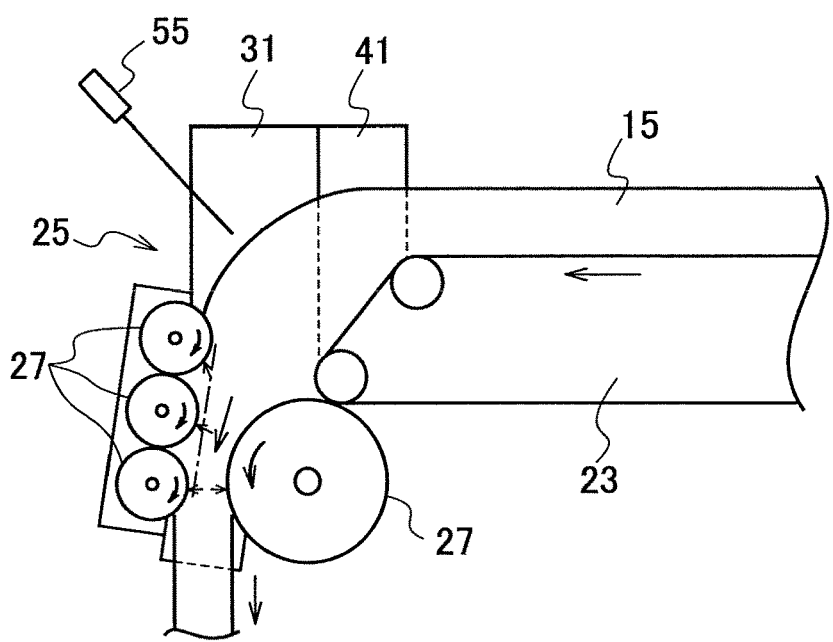
FIG. 15 is an explanatory diagram showing an embodiment in which the configuration of the spreading unit is further changed.

As shown in FIG. 15, the food dough 15 can be gradually spread to be made thinner even if the configuration is such that three spreading rollers 27 are provided on an upper surface side of the food dough 15 and one large spreading roller 27 is provided on a lower surface side of the food dough 15. In more detail, the configuration is such that a distance between the three spreading rollers 27 on the upper surface side of the food dough 15 and the one large spreading roller 27 on the lower surface side of the food dough 15 (a distance shown by an arrow in FIG. 15) becomes gradually narrower as moving downward from the uppermost spreading roller 27 of the three spreading rollers 27 toward the lowermost spreading roller 27. Accordingly, by the configuration in which the distance gradually becomes narrow, identical effects can be achieved as in the V-shaped arrangement described above.

As can be understood from the above explanations, in the configuration, by adjusting the position of the vibration applying members 31 and vibrating the vibration applying members 31 in the longitudinal direction (in the width direction of the food dough 15) of the spreading rollers 27 at the adjusted position, vibration can be applied to the both side edges of the food dough 15 in the width direction. Accordingly, adhesion of the food dough 15 to the vibration applying members 31 can be prevented to perform smooth transfer of the food dough 15. Further, as described above, when the widthwise vibration is applied to the both side edges in the width direction of the food dough 15, compression and release of the both side edges are repeatedly performed. That is, application and release of the internal stress are performed, and thus the internal stress does not remain in the food dough 15.

Even if only one of the pair of vibration applying members 31 is vibrated so as to approach and be separated from the other thereof in the pair of vibration applying members 31, degassing can be performed by repeating compression and release into the inside of the food dough 15 to apply vibration. Accordingly, the food dough 15 is facilitated to flow down by its own weight, thereby enabling to prevent a bridge phenomenon between the spreading rollers 27 and to discharge the food dough 15 downward.

The opposite distance between the pair of vibration applying members 31 can be such that the lower side is narrower than the upper side and the opposite distance of the spreading roller 27 can be such that the lower side is wider than the upper side. With this configuration, when a cubic cut piece as shown in FIG. 8(A) is formed, thicker dough (dough having a large length in each side) can be formed. Accordingly, the food dough 15 is facilitated to flow down by its own weight, thereby enabling to prevent the bridge phenomenon between the spreading rollers 27 and to discharge the food dough 15 downward. When the dough is rounded by an umbrella type rounding device, for example, disclosed in European Patent Application Laid-open No. 0319112, rounding can be effectively performed by supplying substantially cubic dough, and thus application of this embodiment to the umbrella type rounding device is effective.

By further changing the above embodiment, the opposite distance between the pair of vibration applying members 31 can be such that the lower side (the downstream side) is provided to be narrower than the upper side (the upstream side) as described above, and the opposite distance between the spreading rollers 27 can be provided to be the same from the upper side (the upstream side) to the lower side (the downstream side).

The speed of the spreading rollers 27 can be set so as to be the same circumferential velocity from the spreading roller 27 on the upper side (the upstream side) to the spreading roller 27 on the lower side (the downstream side).

The measuring conveyor (the weighing conveyor) 59 and the cutter device 61 constituting the measuring and cutting device according to the invention of the present application are not limited to the above embodiments, and even if the measuring and cutting device is replaced by a measuring and cutting device disclosed in; for example, European Patent Publication No. 1174032, similar effects can be achieved.

As described above, when the both sides in the width direction of the food dough 15 spread by the spreading unit 25 are regulated by the vibration applying members 31, and vibration is applied to the both sides of the food dough 15 by the vibration applying members 31, the both sides of the food dough 15 in the width direction are formed in a smooth surface, without having any irregularities in the both sides. Therefore, when the food dough 15 is divided into a plurality of rows as described above, trimming of the both sides is not required. Accordingly, there is no portion to be removed by trimming, and waste by trimming can be eliminated.

The invention claimed is:

1. A food dough spreading device for gradually spreading food dough to make it thinner, the device comprising:
   at least two opposite spreading rollers to spread the food dough and to reduce a thickness dimension in a thickness direction of the food dough, the thickness direction of the food dough being the same direction as a radial direction of the spreading rollers, each of the spreading rollers being rotatably provided on a roller mount to transfer the food dough in a downward direction, the roller mount is fixed to a mount constituting the food dough spreading device; and
   a pair of vibration applying members provided between the at least two opposite spreading rollers such that the pair of vibration applying members and the two opposite spreading rollers are arranged to surround the food dough, the pair of vibration applying members reciprocatively vibrated in a width direction of the food dough, the width direction of the food dough being the same direction as a longitudinal direction of the spreading rollers, thereby freely regulating a width dimension in the width direction of the food dough, and the pair of vibration applying members being position-adjustable in the longitudinal direction of the spreading rollers, wherein
   the vibration applying members have a perimeter that matches an arrangement of the spreading rollers, wherein the perimeter of each said vibration applying member is formed with perimeter edges that match and at least partially surround a curved perimeter of each of the spreading rollers, and wherein a lower side of each said vibration applying member is configured to be narrower than an upper side of said vibration applying member;
   the vibration applying members are reciprocatively vibrated in a direction approaching and separating from each other in the longitudinal direction of the spreading rollers at a position where the width dimension of the food dough is adjusted, thereby applying vibration to the food dough; and
   the vibration applying members are position-adjustable in the longitudinal direction of the spreading rollers so as to adjust a most closed distance between the vibration applying members at a position where the width dimension of the food dough is adjusted.

2. The food dough spreading device according to claim 1, wherein the spreading rollers are arranged so that at least three spreading rollers are opposite to each other and a distance between the spreading rollers positioned downside is smaller than a distance between the spreading rollers positioned upside.

3. The food dough spreading device according to claim 1, wherein when the pair of vibration applying members are operated to approach each other, a feed rate of the food dough by the spreading rollers is reduced to zero or to a lower speed, and when the pair of vibration applying members are operated to be separated from each other, the feed rate of the food dough by the spreading rollers is increased than the feed rate of the food dough when the vibration applying members are operated to approach each other.

4. The food dough spreading device according to claim 1, wherein the reciprocative vibration of the pair of vibration applying members is set so that a separating operation speed is faster than an approaching operation speed.

5. The food dough spreading device according to claim 3, wherein a deceleration region is provided in a rotation speed of the spreading rollers.

6. The food dough spreading device according to claim 1, wherein the vibration applying members are provided so as to stop temporarily at an open position where the vibration applying members are separated farthest from each other.

7. The food dough spreading device according to claim 1, wherein a transfer unit that transfers the food dough and a measuring and cutting device are provided below the spreading rollers.

8. The food dough spreading device according to claim 7, wherein the measuring and cutting device is provided between the transfer unit and a measuring conveyor provided on a downstream side thereof, and when the food dough has been measured to a measurement value corresponding to a predetermined weight set beforehand, the food dough is cut by a cutter device arranged between the transfer unit and the measuring conveyor.

9. The food dough spreading device according to claim 7, wherein the measuring and cutting device is provided between the transfer unit and the measuring conveyor provided on the downstream side thereof;

a second measuring conveyor is provided on a further downstream side of the measuring conveyor; and a cut piece after being cut by the measuring and cutting device is measured again by the second measuring conveyor, and is transferred.

* * * * *